US012783349B1

(12) United States Patent
Rope et al.

(10) Patent No.: US 12,783,349 B1
(45) Date of Patent: Nov. 3, 2026

(54) APPARATUS AND METHODS FOR TRACKING BIT-FLIP EVENTS

(71) Applicant: Marvell Asia Pte Ltd, Singapore (SG)

(72) Inventors: Todd Rope, Thousand Oaks, CA (US); Lenin Kumar Patra, Dublin, CA (US); Venugopal Balasubramonian, San Jose, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 9 days.

(21) Appl. No.: 18/887,558

(22) Filed: Sep. 17, 2024

Related U.S. Application Data

(60) Provisional application No. 63/543,035, filed on Oct. 6, 2023.

(51) Int. Cl.
*G06F 11/00* (2006.01)
*G06F 11/10* (2006.01)

(52) U.S. Cl.
CPC ........ *G06F 11/102* (2013.01); *G06F 11/1044* (2013.01)

(58) Field of Classification Search
CPC ............... G06F 11/102; G06F 11/1044; G06F 11/0727; G06F 11/3037
See application file for complete search history.

(56) References Cited

U.S. PATENT DOCUMENTS

| | | | | |
|---|---|---|---|---|
| 9,401,222 | B1 * | 7/2016 | Eckert | G11C 29/10 |
| 2009/0164872 | A1 * | 6/2009 | Chessin | G06F 11/1044 714/767 |
| 2011/0191654 | A1 * | 8/2011 | Rub | G06F 11/1072 714/763 |
| 2019/0108111 | A1 * | 4/2019 | Levin | G06F 11/277 |
| 2021/0182135 | A1 * | 6/2021 | Gurumurthi | G06F 11/0727 |
| 2023/0086101 | A1 * | 3/2023 | Li | G06F 11/073 714/6.21 |
| 2024/0020194 | A1 * | 1/2024 | Niu | G06F 11/1048 |
| 2024/0362101 | A1 * | 10/2024 | Breitenbach | G06F 11/076 |
| 2025/0272192 | A1 * | 8/2025 | Jiang | G06F 11/0787 |

* cited by examiner

*Primary Examiner* — Joseph D Manoskey

(57) ABSTRACT

A method for tracking bit-flip events in a plurality of storage devices includes periodically querying respective storage devices of the plurality of storage devices to collect data indicative of bit-flip events occurring at the respective storage devices, aggregating the periodically collected data, and sending the periodically collected data to a management device configured to predict, based on analysis of the periodically collected data, probabilities of future bit-flip events occurring at the respective storage devices. In some embodiments, the method also includes determining at least one approach to compensate for the bit-flip events.

26 Claims, 6 Drawing Sheets

APPARATUS AND METHODS FOR TRACKING BIT-FLIP EVENTS

CROSS REFERENCE TO RELATED APPLICATION

This disclosure claims the benefit of commonly-assigned U.S. Provisional Patent Application No. 63/543,035, filed Oct. 6, 2023, which is hereby incorporated by reference herein in its entirety.

FIELD OF USE

This disclosure relates to storage devices in which bit-flip events may occur. More particularly, this disclosure relates to systems and methods for tracking, predicting, and compensating for, bit-flip events.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

Digital information may be stored in physical storage devices as binary digits (i.e., bits). A bit-flip event may refer to an instance in which the binary value of a stored bit is unintentionally flipped (i.e., from '0' to '1', or vice versa). For example, bit-flip events may occur if a physical storage element is exposed to high-energy electromagnetic radiation, such as a cosmic ray.

SUMMARY

In accordance with implementations of the subject matter of this disclosure, a method for tracking bit-flip events in a plurality of storage devices, the method comprising periodically querying respective storage devices of the plurality of storage devices to collect data indicative of bit-flip events occurring at the respective storage devices, aggregating the periodically collected data, and sending the periodically collected data to a management device configured to predict, based on analysis of the periodically collected data, probabilities of future bit-flip events occurring at the respective storage devices.

In a first implementation of such a method, periodically querying comprises inspecting whether an error correction technique was executed.

According to a first aspect of that first implementation, the method further comprises, in response to determining that the error correction technique was executed on at least one respective storage device, turning off at least one indicator that the error correction technique was executed.

According to a second aspect of that first implementation, the method further comprises, in response to determining that the error correction technique was executed on at least one respective storage device, correcting for at least one corresponding bit-flip event.

According to a third aspect of that first implementation, the method further comprises, in response to determining that the error correction technique was executed, determining at least one bit-flip event and at least one memory address associated with execution of the error correction technique, wherein sending the periodically collected data further comprises sending data regarding the at least one bit-flip event and the at least one memory address to the management device, which is configured to predict, based also on the data regarding the at least one bit-flip event and the at least one memory address, the probabilities of future bit-flip events at occurring at the respective storage devices.

In a second implementation of such a method, periodically querying comprises comparing values of a portion of memory of each respective storage device to reference values of the portion of memory of each respective storage device.

According to a first aspect of that second implementation, the method further includes, in response to determining that at least one bit-flip event occurred based on the comparing, correcting for the at least one bit-flip event.

A third implementation of such a method further comprises determining, based on the analysis, one or more causes of the bit-flip events.

A fourth implementation of such a method further comprises determining, based on the probabilities of future bit-flip events occurring at the respective storage devices, at least one approach to compensate for the bit-flip events.

According to a first aspect of that fourth implementation, determining the at least one approach to compensate for the bit-flip events comprises determining an amount of over-provisioning of the plurality of storage devices.

According to a second aspect of that fourth implementation, determining the at least one approach to compensate for the bit-flip events comprises determining a shielding for the plurality of storage devices.

According to a third aspect of that fourth implementation, determining the at least one approach to compensate for the bit-flip events comprises determining that an error correction approach executing on the respective storage devices is insufficient, and determining a correspondingly improved error correction approach.

In a fifth implementation of such a method, the analysis is a statistical analysis.

In accordance with implementations of the subject matter of this disclosure, an apparatus for tracking bit-flip events comprises a plurality of storage devices and a host device configured to periodically query the respective storage devices to collect data indicative of the bit-flip events occurring at the respective storage devices, aggregate the periodically collected data, and send the periodically collected data to a management device configured to predict, based on analysis of the periodically collected data, probabilities of future bit-flip events occurring at the respective storage devices.

In a first implementation of such an apparatus, the host device is configured to periodically query the respective storage devices by inspecting whether an error correction technique was executed.

According to a first aspect of that first implementation, the host device is further configured to, in response to determining that the error correction technique was executed on at least one respective storage device, turn off at least one indicator that the error correction technique was executed.

According to a second aspect of that first implementation, the host device is further configured to, in response to determining that the error correction technique was executed on at least one respective storage device, correct for at least one corresponding bit-flip event.

According to a third aspect of that first implementation, the host device is further configured to, in response to determining that the error correction technique was executed, determine at least one bit-flip event and at least one memory address associated with the execution of the error correction technique, wherein to send the periodically collected data further comprises sending data regarding the at least one bit-flip event and the at least on memory address to the management device, which is configured to predict, based also on the data regarding the at least one bit-flip event and the at least one memory address, the probabilities of future bit-flip events occurring at the respective storage devices.

In a second implementation of such an apparatus, the host device is configured to periodically query the respective storage devices by comparing values of a portion of memory of each respective storage device to reference values of the portion of memory of each respective storage device.

According to a first aspect of that second implementation, the host device is further configured to, in response to determining that at least one bit-flip event occurred based on the comparing, correct for the at least one bit-flip event.

A third implementation of such an apparatus further comprises the management device.

According to a first aspect of that third implementation, the management device is further configured to determine, based on the analysis, one or more cause of the bit-flip events.

According to a second aspect of that third implementation, the management device is further configured to determine, based on the probabilities of future bit-flip events occurring at the respective storage devices, at least one technique to compensate for the bit-flip events.

In a first instance of that second aspect, to determine the at least one technique to compensate for the bit-flip events comprises determining an amount of overprovisioning of the plurality of storage devices.

In a second instance of that second aspect, to determine the at least one technique to compensate for the bit-flip events comprises determining a shielding for the plurality of storage devices.

In a third instance of that second aspect, to determine the at least one approach to compensate for the bit-flip events comprises determining that an error correction approach executing on the respective storage devices is insufficient, and determining a correspondingly improved error correction approach.

In a fourth implementation of such an apparatus, the analysis is a statistical analysis.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
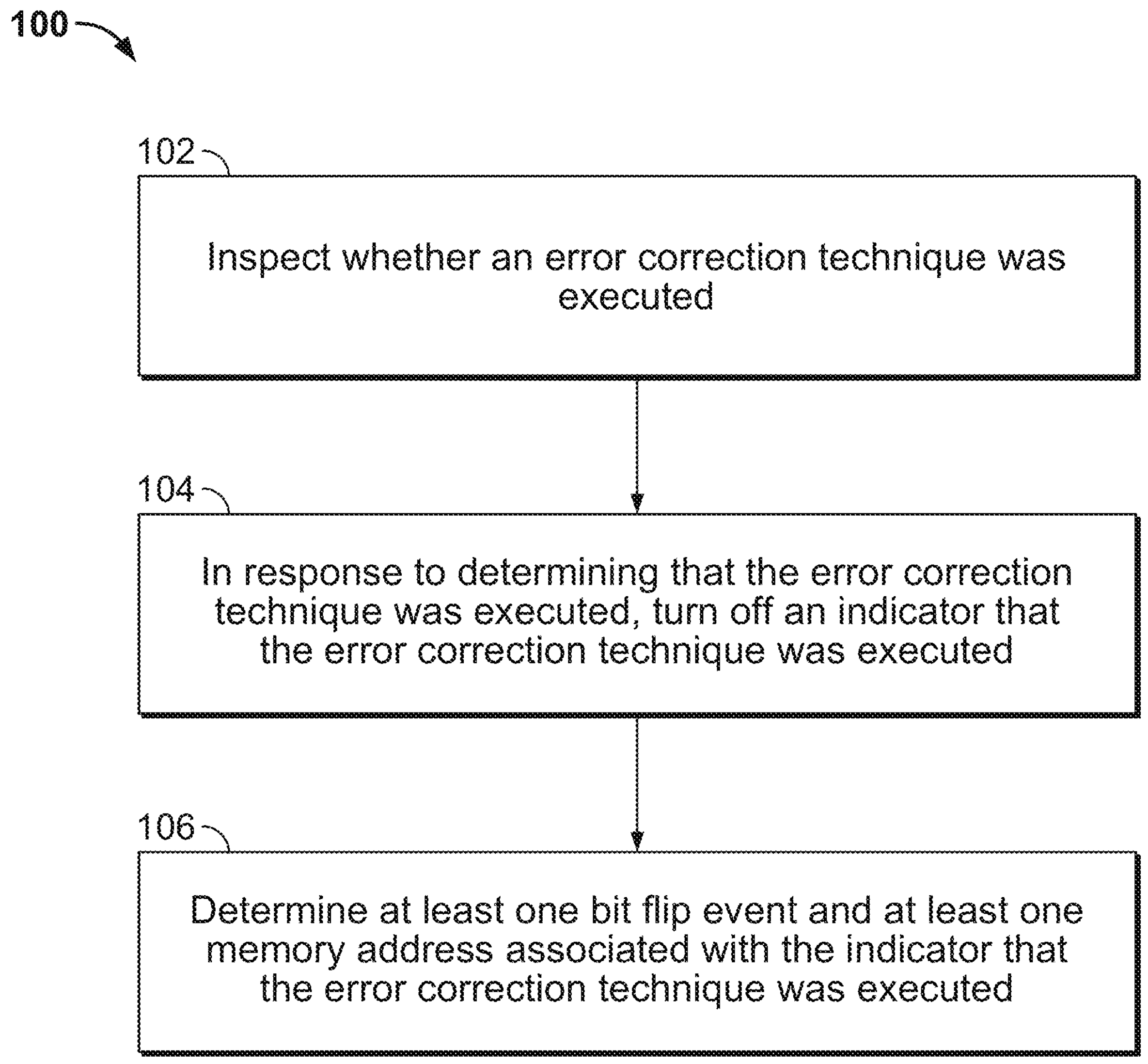
FIG. 1 is a flow diagram illustrating a first method for periodically querying storage devices for data indicative of bit-flip events, in accordance with implementations of the subject matter of this disclosure.

A bit-flip event may occur when a bit that is stored in a physical memory or storage device is unintentionally flipped (i.e., from '0' to '1', or vice versa). Bit-flip events may occur as a result of random uncontrollable phenomena such as cosmic ray impacts. Moreover, the shrinking of integrated circuit processing nodes and discrete memory storage elements increases the vulnerability of those memory storage elements to bit-flip events.

If a bit-flip event occurs, then the data stored on the storage device is no longer correct. Because it may not be possible to completely prevent bit-flip events, a way is needed to detect and compensate for bit-flip events to improve the reliability of storage devices.

However, it may be difficult to detect bit-flip events, particularly in a memory device that does not implement error correction techniques (e.g., based on error correction codes). Even in memory devices that do implement error correction techniques, it may not be possible to distinguish bit-flip events from errors that result from other failure mechanisms (e.g., software errors or physical defects). Even if bit-flip events are detected, there may not be a way to track the bit-flip events over time or to aggregate statistical data on the occurrence of bit-flip events across a large amount of installed memory.

Moreover, compensating for bit-flip events, even when they can be accurately detected, also requires the ability to predict occurrence of bit-flip events at-scale, and to determine optimized compensation solutions that are not overly cumbersome.

In accordance with implementations of the subject matter of this disclosure, apparatus and methods are provided for collecting statistics on bit-flip events and for predicting, based on the statistics, the probabilities of future bit-flip events. In some implementations, a device determines, based on the predictions, parameters of at least one approach to compensate for detected bit-flip events. The device may optimize those parameters to satisfy reliability needs (e.g., to prevent a threshold number of failures due to bit-flip events) according to computational, size, and/or other constraints associated with the physical devices in which the bit-flip events occur.

At least two approaches for collecting the statistics on the bit-flip events are provided. A first approach may be used with memory devices that execute an error correction technique (e.g., based on at least one error correction code or ECC). That first approach includes periodically monitoring for whether an error correction technique was executed. The periodic monitoring may include determining if execution of the error correction technique occurred in response to a bit-flip event. A second approach may be used with memory devices that do not execute error correction techniques. That second approach includes periodically comparing a portion of the memory that was configured with a known pattern to the known pattern. The periodic comparing may include determining, because the portion of the memory does not match the known pattern, that a bit-flip event occurred.

One or more host devices (e.g., optical or electrical switch components) collect (or track) the statistics at one or more respective storage devices. A respective host device periodically queries a respective storage device to collect data (e.g., using either of the aforementioned approaches) indicating whether a bit-flip event has occurred on the storage device since the last periodic query. The one or more host devices aggregate the periodically collected data and provide the corresponding statistical data to a management device. The management device is configured to make predictions about future bit-flip events based on the statistical data.

Based on the predictions, the management device may determine parameters of one or more approaches to compensate for the bit-flip events.

In one approach, the management device may determine an amount of overprovisioning of the storage devices. That is, the management device may determine that a certain number of additional devices are needed to provide enough redundancy to prevent failure of the computing infrastructure if one or more individual devices fail because of bit-flip events.

In another approach, the management device may determine that a certain amount of shielding is needed for the storage devices. That is, the management device may determine that a certain arrangement of physical protection is needed to shield the computing infrastructure and make it less vulnerable to, e.g., incoming cosmic radiation.

In another approach, the management device may determine suitable error correction techniques that can be implemented on the storage devices to correct for bit-flip events. That is, the management device may determine that a certain frequency of execution and/or that a certain number of computation cycles associated with the error correction techniques are needed to correct for the predicted number of bit-flip events.

While separate approaches are provided for collecting bit-flip statistics on devices that do and do not implement error correction techniques, the compensation approach based on error correction techniques may apply to both types of devices. On the one hand, the management device may determine that a device implementing error correction techniques needs to do so in a different way to compensate for predicted bit-flip events. On the other hand, the management device may determine that a device not implementing error correction techniques needs to be doing so to compensate for predicted bit-flip events.

The management device may implement any one or more of the above approaches based on a reliability requirement of the storage devices. That is, the management device may adjust the compensation approach to optimally satisfy the reliability requirement in view of computational bandwidth, size, and/or other constraints, rather than simply introducing excessive over-provisioning, excessive shielding, or overly cumbersome error correction (e.g., that executes too frequently and/or requires too many computations to make a correction). Accordingly, computing reliability may be increased by statistically tracking bit-flip events, predicting future bit-flip events based on the statistics, and compensating for the bit-flip events based on the predictions.

In a general implementation of the subject matter of this disclosure, apparatus for tracking bit-flip events is implemented as at least part of a data center network. Based on a degree of reliability required at the data center, and based on a predicted frequency of bit-flip events at the hardware of the data center, optimized parameters are determined for approaches to compensate for bit-flip events.

In a specific instance of that general implementation, host devices at the data center are coupled to storage devices and configured to track bit-flip event rates at those storage devices. Based on the tracked bit-flip event rates, a management device makes predictions about future bit-flip events. Based on the predictions, as well as other details of the data center (e.g., the total storage capacity, how many bit-flip events would cause a service interruption, and a reliability requirement), the management device determines parameters for at least one approach for how the data center can compensate for the bit-flip events.

The subject matter of this disclosure may be better understood with reference to FIGS. 1-6.

FIG. 1 is a flow diagram of a first illustrative method 100 for periodically collecting data on bit-flip events. Method 100 can be used in connection with the operations at 302 of FIG. 4 and apparatus 400 of FIG. 5. For example, method 100 describes one approach for how a host device 430 may periodically query a corresponding storage device 440 (e.g., as further shown and described at least in connection with FIGS. 5-6) to collect data on bit-flip events. Method 100 may be used on storage devices that execute an error correction technique.

At 102, a host device inspects whether the storage device executed an error correction technique. Execution of the error correction technique may indicate that a bit-flip event occurred. That inspection may include checking an indicator, which may include information about execution of an error correction technique. For example, the information may include a memory address associated with the execution and whether the execution occurred in response to a bit-flip event (e.g., as opposed to occurring in response to a software error or a physical defect).

At 104, in response to determining that the error correction technique was executed, the host device turns off (e.g., by changing an output of the indicator, or by issuing a corresponding command to the storage device) an indicator that the storage device executed the error correction technique. The indicator is turned off so that it is available to turn back on if another bit-flip event occurs. The indicator may include information about the execution of the error correction technique. That information may include a memory address of the corrected bit, and whether the error correction technique occurred in response to a bit-flip event.

At 106, the host device determines at least one bit-flip event and at least one memory address associated with execution of the error correction technique. In some implementations, the operation at 106 also includes determining that execution of the error correction technique occurred in response to a bit-flip event.

In some implementations, a host or management device uses information of the at least one bit-flip event and the at least one memory address to determine (e.g., at 308) a cause of the bit-flip event.

In some implementations, a management device uses information of the at least one bit-flip event and the at least one memory address to determine (e.g., at 310) parameters of at least one approach to compensate for future bit-flip events.

Figure 2:
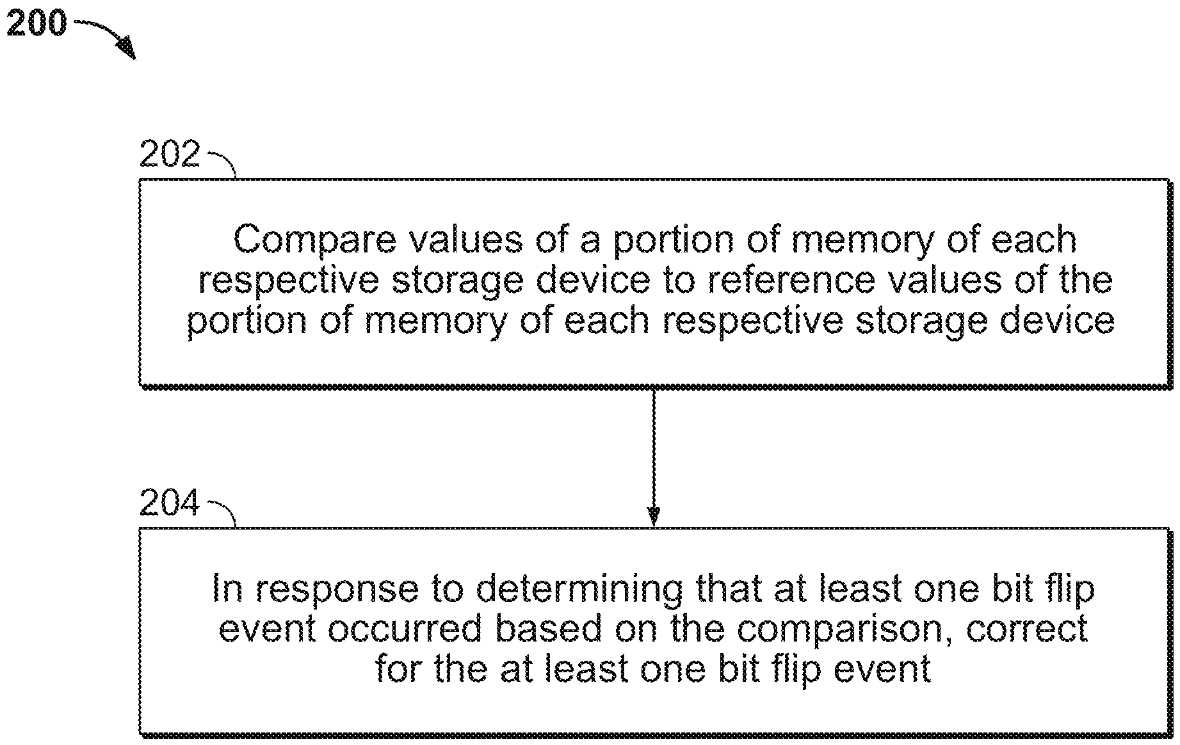
FIG. 2 is a flow diagram illustrating a second method for periodically querying storage devices for data indicative of bit-flip events, in accordance with implementations of the subject matter of this disclosure.

FIG. 2 is a flow diagram of a second illustrative method 200 for periodically collecting data on bit-flip events in memory or storage devices that do not execute an error correction technique. Method 200 can be used in connection with the operations at 302 of FIG. 4 and apparatus 400 of FIG. 5.

Figure 3:
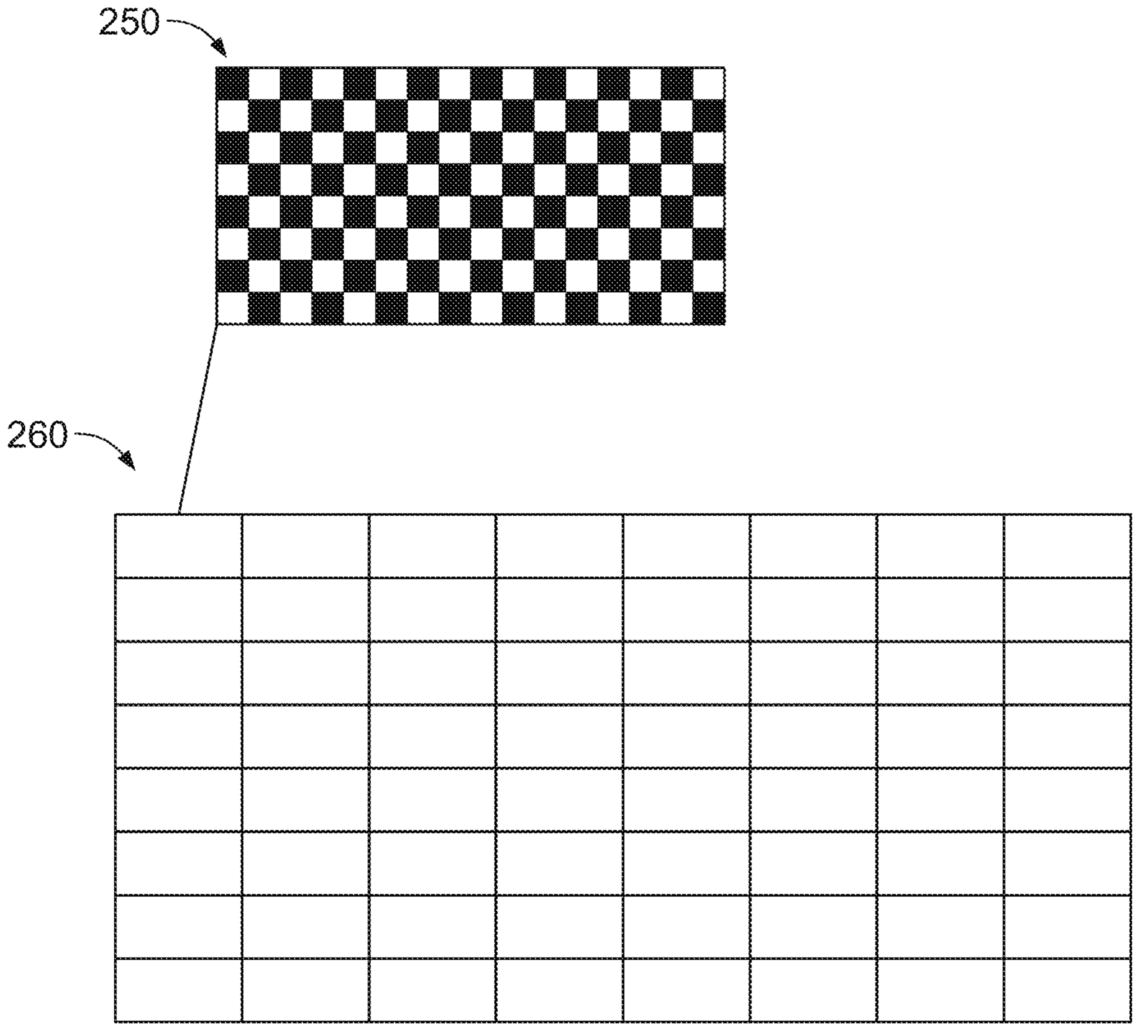
FIG. 3 is a block diagram illustrating a memory array configured to be periodically queried to determine whether bit-flip events occurred, in accordance with implementations of the subject matter of this disclosure.

To perform the method of FIG. 2, a known pattern (e. g., 0x555aaaa, which is a "checkerboard" pattern as shown in FIG. 3, or a pattern where all values are '0' or all values are '1', or a pseudo-random binary sequence with or without a seed, or any other suitable pattern) may be written to a portion of memory of a storage device (e.g., any storage device 440). The host device (e.g., any host device 430) also stores the known pattern for comparison, as further described below.

At 202, one or more host devices compare values of a portion of memory (e.g., memory portion 250) stored at a corresponding number of respective storage devices to reference values (e.g., a known pattern) of the portion of memory of each respective storage devices. Each host device may compare the read values to the reference values. Each host device may then determine that there was a bit-flip event based on a mismatch between the read values and the reference values.

At 204, in response to determining that at least one bit-flip event occurred based on the comparison, the one or more host devices correct for the at least one bit-flip event. Each host device may determine a memory address of each bit where the read value did not match the reference value. Each host device may then send a command to the corresponding storage device that causes the storage device to re-write the flipped bit to its reference value. After correcting for the at least one bit-flip event, the host device can detect future bit-flip events (e.g., by repeating the operations at 202) without double-counting of individual bit-flip events.

FIG. 3 is a block diagram illustrating a memory array (e.g., that is stored on a storage device) that stores reference values for tracking bit-flip events (e.g., using method 200). For example, the device storing the memory 260 may not be configured to execute error correction techniques and is therefore configured to store the reference values in memory portion 250.

Memory portion 250 may be programmed with reference values based on a known pattern (e.g., a "checkerboard" pattern, as shown, or any other suitable pattern). When tracking bit-flip events in the memory portion 250, a host device (e.g., any suitable host device 430) compares (e.g., using the operation at 202) the data of memory portion 250 to the reference values. If the read values differ from the reference values (e.g., if the "checkerboard" pattern was broken), then the host device concludes that a bit-flip event occurred. In response, the host device may cause the flipped bits of memory portion 250 to be restored to the corresponding reference values (e.g., using the operations at 204).

Memory portion 250 may be any suitable portion of memory array 260, which may be any suitable size. Aside from memory portion 250, the other portions of memory array 260 may store any suitable data, and these cells are only depicted as blank cells for ease of interpretation.

Figure 4:
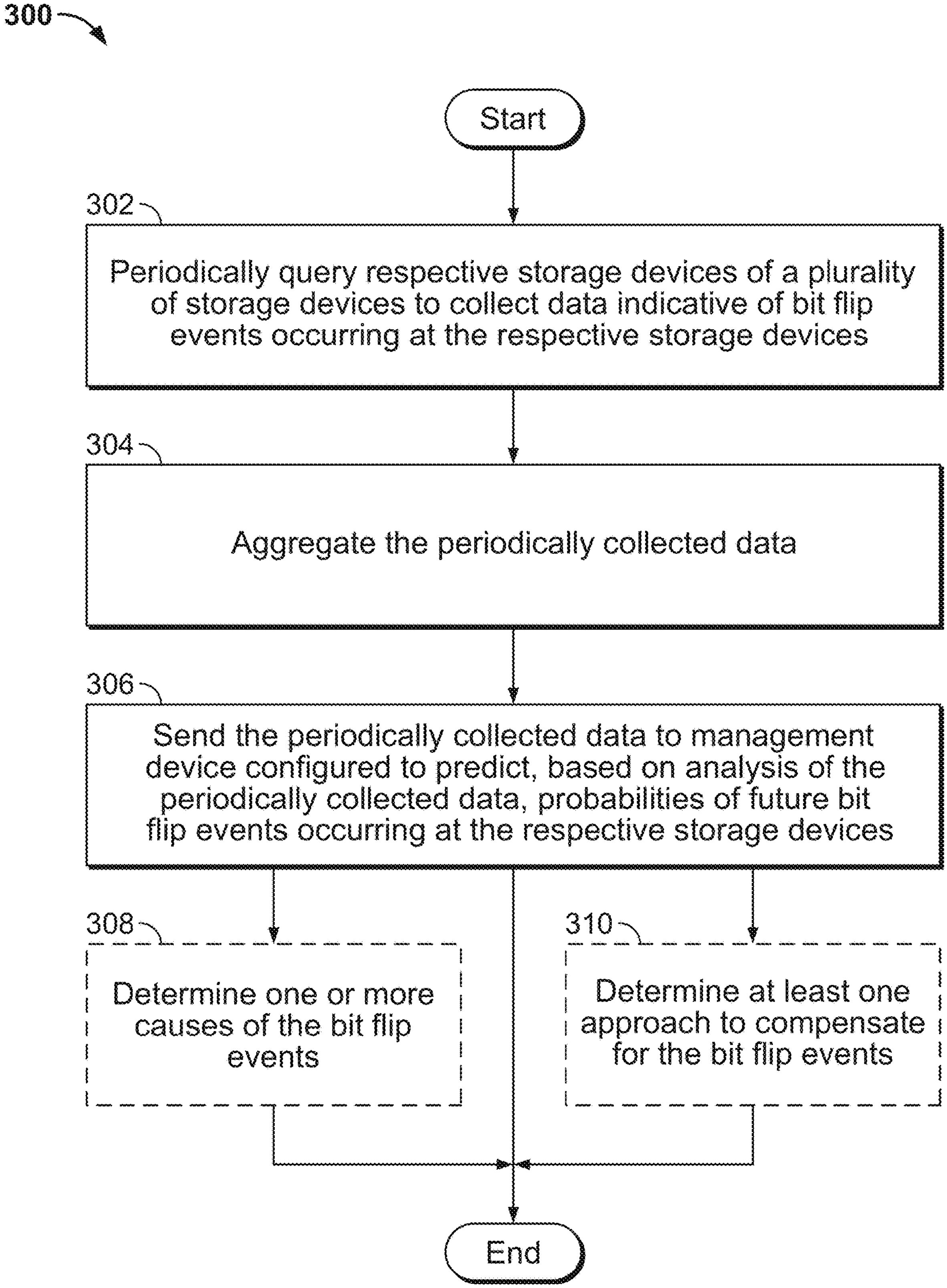
FIG. 4 is a flow diagram illustrating a method for tracking bit-flip events, in accordance with implementations of the subject matter of this disclosure.
Figure 5:
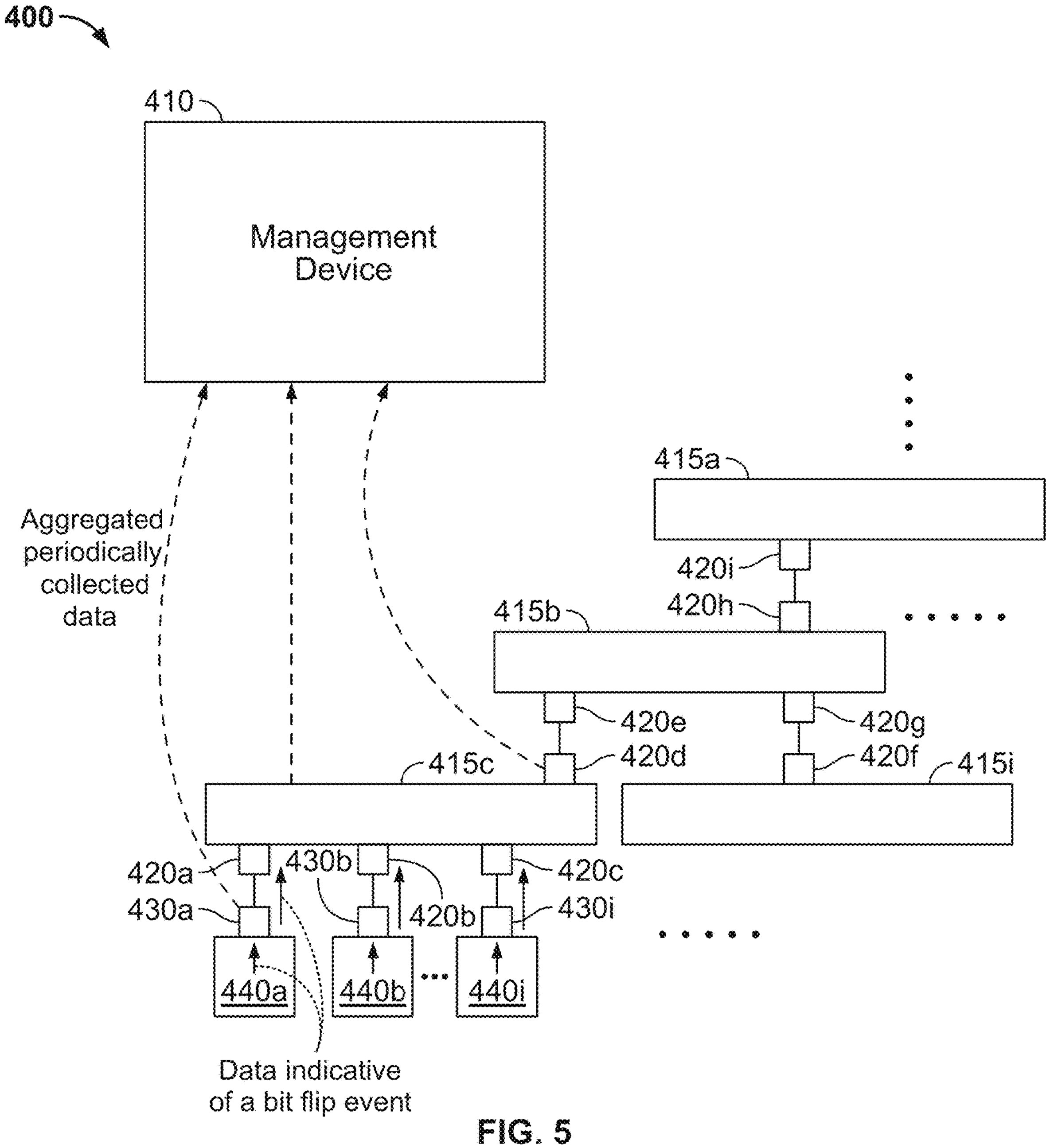
FIG. 5 is a block diagram of an apparatus configured to track bit-flip events, in accordance with implementations of the subject matter of this disclosure.

FIG. 4 is a flow diagram of a method 300 that may be used to track bit-flip events. For example, operation of apparatus 400 (as shown in FIG. 5) may include using method 300 (e.g., at host devices 430, and optionally at one or more host devices 420) to track bit-flip events on storage devices 440 and optionally to compensate for these bit-flip events.

At 302, one or more host devices (e.g., host device 430 or host device 420) periodically query respective storage devices (e.g., any one or more storage devices 440) of a plurality of storage devices (e.g., all, or at least some of the storage devices 440) to collect data indicative of bit-flip events occurring at the respective storage devices.

As mentioned above, the operations at 302 may include statistical tracking of the bit-flip events. If the storage devices implement error correction techniques, then the operations at 302 may include method 100; if the storage devices do not implement error correction techniques, then the operations at 302 may include method 200.

At 304, a host device aggregates the periodically collected data. In some implementations, the host device aggregating the periodically collected data is the same as the host device periodically querying the respective storage device (e.g., a host device 430 may perform the operations at 302 and at 304). In other implementations, the host device (e.g., a first host device, which may be any host device 420) aggregating the periodically collected data is communicatively coupled to the host device (e.g., a second host device, which may be any host device 430) periodically querying the respective storage device.

In some implementations, aggregating the periodically collected data at 304 includes determining a bit-flip event rate. For example, the bit-flip event rate may be determined as a number of bit-flip events per unit time and/or per unit memory.

In one illustrative implementation, the aforementioned first host device periodically queries the aforementioned second host device. Through this arrangement, the first host device periodically queries at least one respective storage device (despite not necessarily being communicatively coupled to the respective storage device). The first host device may query the second host device each time that the second host device queries the respective storage device (e.g., the second host device may not aggregate the periodically collected data). Alternatively, the first host device may query the second host device less frequently than the second host device queries the respective storage device (e.g., the second host device may aggregate the periodically collected data and provide the aggregated data to the first host device).

At 306, a host device (e.g., a host device 420 or a host device 430) sends the periodically collected data to a management device (e.g., management device 410) configured to predict, based on analysis (e.g., statistical analysis, such as approaches that include artificial intelligence algorithms) of the periodically collected data, probabilities of future bit-flip events occurring at the respective storage devices.

In some implementations, sending the periodically collected data at 306 includes communicating using any suitable standard or protocol. For example, the communication may be based on the Common Management Interface Specification (CMIS) standard. In particular, the communication may be based on details provided in the Versatile Diagnostic Monitoring section of the CMIS standard.

The management device may be configured to perform the analysis using any suitable approach. For example, some illustrative and non-limiting approaches include a linear regression, any suitable neural network, any suitable generative artificial intelligence, any other statistical analysis approach, or any combination thereof. In some implementations, the analysis may be used to generate an average number of bit-flip events and/or an average bit-flip event rate for apparatus 400.

In some implementations, method 300 finishes with the operations at 306. In other implementations, method 300 includes the optional operations at 308, the optional operations at 310, or both.

At 308, the management device determines (e.g., based on the analysis at 306) one or more causes of the bit-flip events. For example, the one or more causes may include cosmic rays, other electromagnetic pulses or radiation, other environmental factors, aspects of the devices, or any combination thereof. The one or more causes may reveal, e.g., that storage devices at a particular location are more susceptible to bit-flip events and thus require more compensation than those at other locations.

At 310, the management device determines (e.g., based on the analysis at 306, and optionally further based on the one or more causes determined at 308, and optionally further based on a reliability requirement of the computing infrastructure) parameters of at least one approach to compensate for the bit-flip events.

In connection with the operations at 310, the predictions of future bit-flip events may be used to determine a failure rate of the respective storage devices 440. The failure rate may be used to determine (e.g., based on a desired reliability of apparatus 400) parameters (beyond those which are needed in the absence of any bit-flip events and corresponding device failures) of at least one approach to compensate for bit-flip events and to maintain reliability should the predicted number of bit-flip events occur.

In some implementations, the parameters of at least one approach to compensate for the bit-flip events include an amount of overprovisioning (i.e., an amount of hardware redundancy) of the respective storage devices 440. For example, the parameters may include a number of additional storage devices 440.

In some implementations, the parameters of an approach to compensate for the bit-flip events include an amount of shielding (e.g., introduction of additional materials) of the respective storage devices 440. For example, the parameters may include an amount or type of additional material for shielding storage devices 440.

In some implementations, the parameters of an approach to compensate for the bit-flip events include at least one aspect of an error correction approach that is executed (or can be configured to execute) on the respective storage devices 440. That is, an error correction technique that is being executed on the respective storage devices 440 may be modified, or an error correction technique may be introduced on the respective storage devices 440. The at least one aspect of the error correction approach may include one or more types of ECC to execute, a frequency for executing the one or more ECCs, and/or a number of cycles that the ECC can execute when attempting to correct an error.

In some implementations, the one or more storage devices are already configured to execute at least one ECC, and determining to use a compensation approach based on an error correction technique includes determining that the existing ECC execution is insufficient (e.g., based on a prediction of future bit-flip events and a reliability requirement). For example, a management device may determine, based on the statistical tracking, that an existing approach for executing ECCs may not run frequently enough or may not fix enough bit-flip events (e.g., based on a specific ECC code or an amount of memory allocated to execution of the ECC code). Accordingly, a new ECC may be introduced, and/or a frequency or number of cycles associated with the existing ECC approach may be increased.

In some implementations, the parameters of an approach to compensate for the bit-flip events include any combination of an amount of overprovisioning, an amount of shielding, or an approach to correct for the bit-flip events.

FIG. 5 is a high-level block diagram of an apparatus 400 for tracking bit-flip events, in accordance with implementations of the subject matter of this disclosure. In some implementations, apparatus 400 represents a storage and/or computing network (e.g., as may be associated with a data center, hyperscaler, or other computing infrastructure), as further described below.

Apparatus 400 includes management device 410 (e.g., any suitable network management device) and multiple tiers of switches 415. Apparatus 400 also includes multiple host devices 420 (e.g., which may be referred to as first host devices, and which may serve to aggregate bit-flip event data), each of which is associated with a respective switch 415. Apparatus 400 also includes multiple host devices 430 (e.g., which may be referred to as second host devices, which may serve to periodically query respective storage devices, and which may further serve to aggregate bit-flip event data), each of which may be associated with a respective storage device 440 and a respective switch 415. Each host device 430 receives data (e.g., based on periodic querying) on bit-flip events that occur on the corresponding storage device 440. Apparatus 400 also includes any suitable number of storage devices 440 (e.g., any device including memory and processing circuitry, such as servers).

In some implementations, the host devices 420 and the host devices 430 may be optical or electrical components that include memory. For example, the optical or electrical components may also be switches, or they may be pluggable modules that couple to a switch, router, or network interface card. The memory of each host device 430 may be coupled to memory and/or processing circuitry of the corresponding storage device 440. Through this coupling, the host device 430 can track (e.g., based on periodic querying) bit-flip events occurring on the corresponding storage device 440.

Each of the host devices 420 and 430 is communicatively connected to at least some, and possibly all, of the other host devices 420 and 430 (e.g., through a mesh network connection or any other suitable network-based communication). Moreover, at least some of the host devices 420 and/or the host devices 430 are communicatively coupled to the management device 410. The host devices that are communicatively coupled to management device 410 may be configured to aggregate data and provide the aggregated data to the management devices 410. Some host devices (e.g., host devices 430) may aggregate data as directly received from one or more other host devices (e.g., one or more host devices 420), and some host devices (e.g., host devices 420) may aggregate data as directly received from a corresponding storage device 440.

Illustrative and nonlimiting data flows through apparatus 400 are shown by the dashed and solid arrows. These arrows show the flows of bit-flip event data through apparatus 400 and to management device 410. During operation of apparatus 400, each host device 430 is configured to periodically query the corresponding storage device 440 for bit-flip event data (e.g., using the techniques described at least in connection with FIGS. 1 and 2). Based on this periodic querying, the host device 430 may determine whether a bit-flip event occurred since the last query. Moreover, each host device 420 may be configured to periodically query other host devices (e.g., any suitable host device 420 and/or host device 430) to receive data (e.g., which may be aggregated) on bit-flip events at one or more storage device 440.

FIG. 5 depicts apparatus 400 as a collection of devices (e.g., that may be arranged as a network or any other suitable computing infrastructure) that may be scaled in any way. For example, apparatus 400 may represent a data center. Accordingly, apparatus 400 may include any suitable number of switches 415, host devices 420 and 430, and storage devices 440.

In FIG. 5, common reference numerals (e.g., as illustrated by 415*a* and 415*b*) are used to indicate discrete and comparable devices. For example, each of these devices may be respective units of the same model component. Moreover, a reference numeral terminating in 'i' (i.e., 420*i*) indicates that there may be any number of the corresponding device. Despite not being explicitly shown in FIG. 5, apparatus 400 may include additional levels of switches, horizontally and/or vertically, as depicted by the " . . . " symbols.

Figure 6:
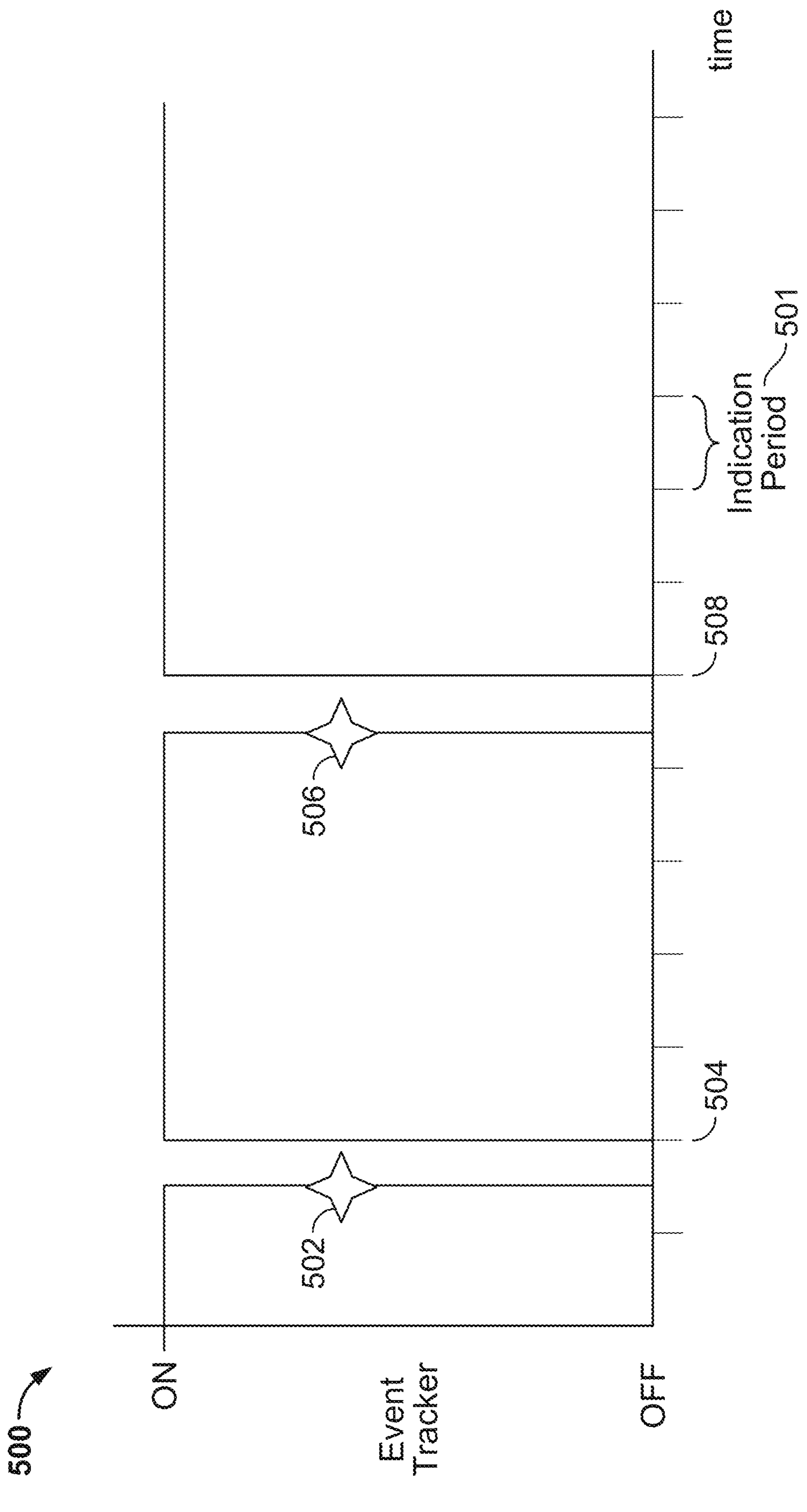
FIG. 6 is a timing diagram illustrating periodic inspection of a bit-flip event tracker, in accordance with implementations of the subject matter of this disclosure.

FIG. 6 is a timing diagram 500 illustrating how a host device (e.g., any host device 430) may periodically query a storage device (e.g., any storage device 440) that executes an error correction technique. For example, timing diagram 500 may correspond to the operations at 102 and 104.

The horizontal axis of timing diagram 500 represents a progression of time including a series of indication periods 501. Each indication period 501 may be any suitable length of time (e.g., one second). At the end of each indication period 501, the host device queries (e.g., as described at 102) the storage device and determines, based on the state of the event tracker, whether a bit-flip event occurred during the indication period 501. If a bit-flip event occurred, as indicated by the event tracker being OFF, the host device turns the event tracker back ON (e.g., as described at 104).

The vertical axis of timing diagram 500 represents a binary indicator of whether an event tracker (e.g., that runs on the storage device) is ON or OFF. The event tracker monitors whether the storage device executed an error correction technique. If the storage device executed an error correction technique, then the event tracker is configured to turn OFF, which may indicate that a bit-flip event occurred.

At the initial time of timing diagram 500, the event tracker is running on the storage device, as shown by the event tracker being ON. Then, a first bit-flip event 502 occurs, which causes the event tracker to turn OFF. The event tracker may be configured to turn OFF in response to tracking an event to save computing bandwidth on the storage device, and/or to prevent duplicate reporting of an individual bit-flip event. Moreover, the event tracker can be configured to turn OFF to prevent computing overload on a microcontroller unit or other device processing the detection event, which may occur if the event tracker is left ON and there is duplicative reporting of a bit-flip event.

Time 504 represents a transition to a new indication period 501 after the event tracker turned OFF. At this transition, the host device performs a periodic query and determines that a bit-flip event occurred based on the event tracker being OFF. Moreover, the host device causes the event tracker to be turned back ON (e.g., by issuing a command to the storage device), as shown.

After any number of indication periods 501 in which no bit-flip event occurs, a second bit-flip event 506 occurs. Thus, at time 508, the host device collects additional data indicating that there was a bit-flip event, and then turns the event tracker back ON.

Though not further shown in FIG. 6, additional tracking of bit-flip events can continue until there is enough data to determine statistics for bit-flip events, to determine predictions of future bit-flip events based on the statistics, and to determine parameters of at least one compensation approach for the bit-flip events based on the predictions.

Thus it is seen that an apparatus for tracking bit-flip events, and a method for operating the apparatus, has been provided.

As used herein and in the claims which follow, the construction "one of A and B" shall mean "A or B."

It is noted that the foregoing is only illustrative of the principles of the invention, and that the invention can be practiced by other than the described implementations, which are presented for purposes of illustration and not of limitation, and the present invention is limited only by the claims which follow.

What is claimed is:

1. A method for tracking bit-flip events in memory cells of a plurality of storage devices, the method comprising:
- periodically querying respective storage devices of the plurality of storage devices to collect data indicative of bit-flip events occurring in memory cells at the respective storage devices;
- aggregating the periodically collected data;
- sending the periodically collected data to a management device configured to predict, based on analysis of the periodically collected data, probabilities of future bit-flip events occurring at the respective storage devices;
- determining, based on the probabilities of future bit-flip events occurring at the respective storage devices, a first approach to compensate for the bit-flip events in at least one storage device of the plurality of storage devices at a first location and a second, different approach to compensate for the bit-flip events in at least another storage device of the plurality of storage devices at a second, different location; and
- executing at least one of the first approach to compensate for the bit-flip events in the at least one storage device of the plurality of storage devices at the first location or the second, different approach to compensate for the bit-flip events in the at least another storage device of the plurality of storage devices at the second, different location.

2. The method of claim 1, wherein periodically querying comprises inspecting whether an error correction technique was executed.

3. The method of claim 2, further comprising, in response to determining that the error correction technique was executed on at least one respective storage device, turning off at least one indicator that the error correction technique was executed.

4. The method of claim 2, further comprising, in response to determining that the error correction technique was executed on at least one respective storage device, correcting for at least one corresponding bit-flip event.

5. The method of claim 2, further comprising, in response to determining that the error correction technique was executed, determining at least one bit-flip event, and at least one memory address, associated with execution of the error correction technique, wherein sending the periodically collected data further comprises sending data regarding the at least one bit-flip event, and the at least one memory address, to the management device, which is configured to predict, based also on the data regarding the at least one bit-flip event, and the at least one memory address, the probabilities of future bit-flip events at occurring at the respective storage devices.

6. The method of claim 1, wherein periodically querying comprises comparing values of a portion of memory of each respective storage device to reference values of the portion of memory of each respective storage device.

7. The method of claim 6, further comprising, in response to determining that at least one bit-flip event occurred based on the comparing, correcting for the at least one bit-flip event.

8. The method of claim 1, further comprising determining, based on the analysis, one or more causes of the bit-flip events.

9. The method of claim 1, wherein determining the first approach to compensate for the bit-flip events comprises determining an amount of overprovisioning of the plurality of storage devices.

10. The method of claim 1, wherein determining the second approach to compensate for the bit-flip events comprises determining a shielding for the plurality of storage devices.

11. The method of claim 1, wherein determining the second approach to compensate for the bit-flip events comprises determining that an error correction approach executing on the respective storage devices is insufficient, and determining a correspondingly improved error correction approach.

12. The method of claim 1, wherein the analysis is a statistical analysis.

13. The method of claim 1, further comprising optimizing one or more parameters associated with the first approach to compensate for the future bit-flip events or the second approach to compensate for the future bit-flip events based on a predicted frequency of the future bit-flip events.

14. An apparatus for tracking bit-flip events, the apparatus comprising:

a plurality of storage devices;

a management device; and a host device configured to:

periodically query the respective storage devices to collect data indicative of the bit-flip events occurring in memory cells at the respective storage devices, aggregate the periodically collected data, and send the periodically collected data to the management device, wherein the management device is configured to:

predict, based on analysis of the periodically collected data, probabilities of future bit-flip events occurring at the respective storage devices, determine, based on the probabilities of future bit-flip events occurring at the respective storage devices, a first approach to compensate for the bit-flip events in at least one storage device of the plurality of storage devices at a first location and a second, different approach to compensate for the bit-flip events in at least another storage device of the plurality of storage devices at a second, different location, and execute at least one of the first approach to compensate for the bit-flip events in the at least one storage device of the plurality of storage devices at the first location or the second, different approach to compensate for the bit-flip events in the at least another storage device of the plurality of storage devices at the second, different location.

15. The apparatus of claim 14, wherein the host device is configured to periodically query the respective storage devices by inspecting whether an error correction technique was executed.

16. The apparatus of claim 15, wherein the host device is further configured to, in response to determining that the error correction technique was executed on at least one respective storage device, turn off at least one indicator that the error correction technique was executed.

17. The apparatus of claim 15, wherein the host device is further configured to, in response to determining that the error correction technique was executed on at least one respective storage device, correct for at least one corresponding bit-flip event.

18. The apparatus of claim 15, wherein the host device is further configured to, in response to determining that the error correction technique was executed, determine at least one bit-flip event, and at least one memory address, associated with the execution of the error correction technique, wherein to send the periodically collected data further comprises sending data regarding the at least one bit-flip event, and the at least on memory address, to the management device, which is configured to predict, based also on the data regarding the at least one bit-flip event, and the at least one memory address, the probabilities of future bit-flip events occurring at the respective storage devices.

19. The apparatus of claim 14, wherein the host device is configured to periodically query the respective storage devices by comparing values of a portion of memory of each respective storage device to reference values of the portion of memory of each respective storage device.

20. The apparatus of claim 19, wherein the host device is further configured to, in response to determining that at least one bit-flip event occurred based on the comparing, correct for the at least one bit-flip event.

21. The apparatus of claim 14, wherein the management device is further configured to determine, based on the analysis, one or more cause of the bit-flip events.

22. The apparatus of claim 14, wherein the first approach comprises an amount of overprovisioning of the plurality of storage devices.

23. The apparatus of claim 14, wherein the second approach comprises a shielding for the plurality of storage devices.

24. The apparatus of claim 14, wherein the second approach comprises determining that an error correction approach executing on the respective storage devices is insufficient, and determining a correspondingly improved error correction approach.

25. The apparatus of claim 14, wherein the analysis is a statistical analysis.

26. The apparatus of claim 14, wherein the management device is configured to optimize one or more parameters associated with the first approach to compensate for the future bit-flip events or the second approach to compensate for the future bit-flip events based on a predicted frequency of the future bit-flip events.

* * * * *